(12) United States Patent  (10) Patent No.: US 9,091,393 B2
Huang  (45) Date of Patent: Jul. 28, 2015

(54) LIFTING TYPE SUPPORT STAND

(71) Applicant: Ming Hua Huang, Kaohsiung (TW)

(72) Inventor: Ming Hua Huang, Kaohsiung (TW)

( * ) Notice: Subject to any disclaimer, the term of this patent is extended or adjusted under 35 U.S.C. 154(b) by 229 days.

(21) Appl. No.: 13/928,401

(22) Filed: Jun. 27, 2013

(65) Prior Publication Data

US 2015/0001355 A1  Jan. 1, 2015

(51) Int. Cl.
*F16M 11/00* (2006.01)
*F16M 11/18* (2006.01)
*F16M 11/04* (2006.01)
*F16M 11/42* (2006.01)

(52) U.S. Cl.
CPC ............. *F16M 11/18* (2013.01); *F16M 11/046* (2013.01); *F16M 11/42* (2013.01)

(58) Field of Classification Search
CPC ..... F16M 11/42; F16M 11/046; F16M 11/24; F16M 11/00; F16M 11/04; F16M 11/18
USPC ........... 248/123.11, 121, 122.1, 125.1, 125.2, 248/125.3; 108/147
See application file for complete search history.

(56) References Cited

U.S. PATENT DOCUMENTS

| 5,311,827 | A  | * | 5/1994 | Greene | ........................ 108/147 |
| 5,400,721 | A  | * | 3/1995 | Greene | ........................ 108/147 |
| 7,784,747 | B2 | * | 8/2010 | Gan et al. | ...................... 248/132 |
| 8,267,360 | B2 | * | 9/2012 | Su | ............................ 248/123.11 |
| 2011/0174936 | A1 | * | 7/2011 | Cox | ............................. 248/121 |
| 2011/0233350 | A1 | * | 9/2011 | Burgess et al. | .......... 248/123.11 |
| 2012/0217690 | A1 | * | 8/2012 | Jenkins | ........................ 269/54.5 |

* cited by examiner

*Primary Examiner* — Anita M King
(74) *Attorney, Agent, or Firm* — Leong C. Lei

(57) ABSTRACT

A lifting type support stand includes a foot stand, on which a drag mechanism and hanging tool moving mechanism are mounted, where two ropes configured on a sheave is used to couple the drag mechanism to hanging tool moving mechanism. The hanging tool moving mechanism can be driven to move vertically along the foot stand when the sheave is rotated. The rear side of sheave is projected with a scroll, the periphery of which is configured with an approximately tapered spiral line rope race. The rope race is surrounded with a drag rope, two ends of which are respectively coupled to the sheave and an extension spring, a reaction force of the spring is utilized to mount the hanging tool moving mechanism and display device. Whereby, a vertical position and moving distance of a display device can be adjusted and increased by moving the drag rope on the rope race.

8 Claims, 12 Drawing Sheets

LIFTING TYPE SUPPORT STAND

(a) TECHNICAL FIELD OF THE INVENTION

The present invention relates to a lifting type support stand, and more particularly to a lifting type support stand helpful to adjust a vertical position of a display device, increase a moving distance thereof and stop it at will steplessly.

(b) DESCRIPTION OF THE PRIOR ART

To provide a mount stability and convenience for a display device such as screen, whiteboard, blackboard or other planar electronic products, a cabinet (rack) is usually used to mount the display device, or a hanging arm, support arm may also be used to hang the display device, thereby achieving use convenience. But, the display on the cabinet can not be operated to move vertically to adjust a viewed position, and a larger space must be provided for the hanging arm, support arm to allow the vertical position of the display device hung thereby to be adjusted. Therefore, no matter that the cabinet, hanging arm or support arm is used to mount the display, it still be inconvenient in use and operation.

To improve the disadvantages mentioned above, a lifting type support stand is designed, as FIG. 1 shows. Such kind of lifting type support stand is configured with a fixation seat 10 on which a wheel disk 11 and second wheel disk 12 are configured, where the periphery of the first wheel disk 11 is mounted with a first rope 13, one end of the first rope 13 is fixed on the first wheel disk 11, and another end thereof is coupled to a frame 14; the frame 14 can be driven to move vertically at the time that the first wheel disk 11 is rotated, and the periphery of the second wheel disk 12 is mounted with a second rope 15, one end of the second rope 15 is fixed on the first wheel disk 11, and another end thereof is coupled to one end of a spring 16, and another end of the second spring 16 is coupled to the fixation seat 10. Whereby, the frame 14 is driven to move vertically by coupling the first rope 13 to the frame 14 and rotating the first wheel disk 11. Meanwhile, the spring 16 is pulled through the rotation of the second wheel disk 12 so as to use a reaction force of the spring 16 to mount the frame 14 and the display device, because the second rope 15 is coupled to the spring 16.

The lifting type support stand can be used to adjust a vertical position of a display device, and the motion of the display device can be stop at will steplessly, but the first wheel disk 11, second wheel disk 12 is caused to rotate at most only three-quarters turn and further to limit a vertical moving distance of the frame 14 due to the second rope 15 blocking the first wheel disk 11 and second wheel disk 12 when they are rotated, because the vertical moving distance of the frame 14 is limited to the length of the first rope 13, second rope 15, and the first rope 13 and second rope 15 are fixed on the first wheel disk. Furthermore, it is easy to cause an instant reaction force of the spring 16 to be too large or too small when the frame 14 and display device are moved, causing the frame 14 and display device to rise or drop suddenly, resulting in a deficiency of inconvenience in use, operation, because the spring 16 is pulled by the second rope 15 to generate the reaction force to mount the frame 14 and display device.

SUMMARY OF THE INVENTION

To improve the deficiencies mentioned above, the present invention is proposed.

The main object of the present invention is to provide a lifting type support stand, in which a moving distance of a drag rope is smaller than a moving distance of a first rope, second rope when a sheave is rotated, leading to the decrease of an extension, use length of an extension spring, the reduction of a reaction force of the extension spring, and the prevention of a hanging tool moving mechanism and display device from sudden rise or drop while being moved vertically, because the drag rope used to drag the extension spring surrounding along a rope race on the rear side of a sheave, which is disposed on the periphery of a scroll to form an approximately tapered spiral line, and further because the curvature radius of the rope race is smaller than the radius of the first slot way, second slot way, causing the perimeter of the rope race is smaller than the perimeter of a first slot way, second slot way.

Another object of the present invention is to provide a lifting type support stand, in which the distance between a drag rope and a sheave is varied with the rolling-up or releasing of the sheave, capable of decreasing an extension length of an extension spring, reducing a reaction force to form a force balancing state when the extension spring is exerted with a force to extend, and preventing sudden rise or sudden drop when a display device is moved vertically by utilizing Pythagorean theorem, because a rope race surrounded by a drag rope of the present invention is an approximately tapered spiral line; the drag rope is moved near to the axle center of the sheave along the route of the spiral line with the rotation of the sheave when the display device is positioned at a lower point, and the drag rope is moved away from the axle center of the sheave along the route of the spiral line with the rotation of the sheave when the display device is positioned at a higher point.

Still another object of the present invention is to provide a lifting type support stand, in which a drag rope is moved outward to the outside of a sheave along the route of a rope race when the sheave is rotated, capable of preventing it from interfering with a coupling end of the sheave to which the drag rope is coupled when the drag rope is rotated, increasing the circle number of the sheave, and further increasing the vertically moved distance of a hanging tool moving mechanism and display device, because a height of a scroll configured on the sheave of the present invention increases from outside to inside with the routine thereof, allowing the rope race configured on the periphery of the scroll to form an approximately tapered spiral line.

DETAILED DESCRIPTION OF THE PREFERRED EMBODIMENTS

FIGS. 2 to 13 illustrate the technical means and structures applied for objects of a preferred embodiment according to the present invention.

Figure 1:
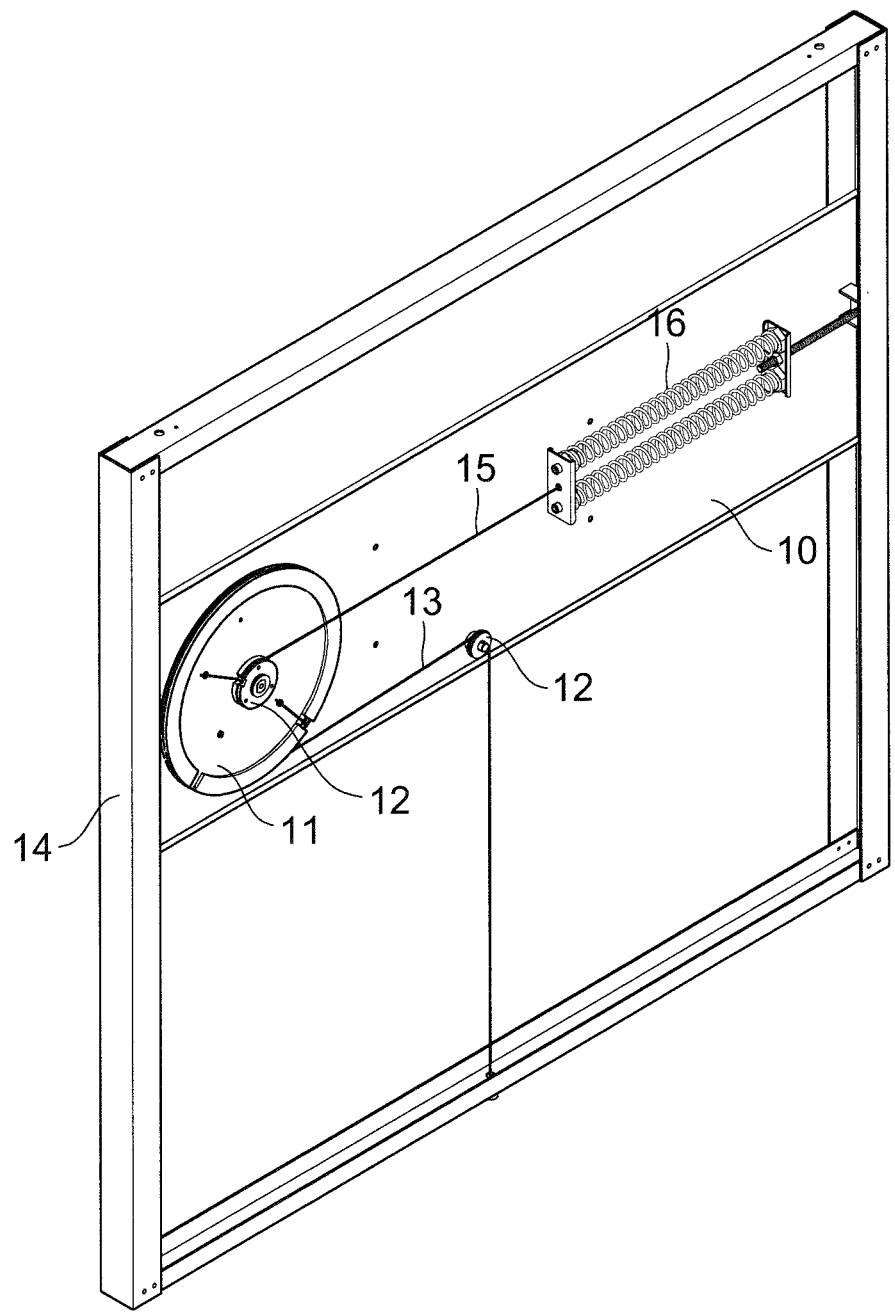
FIG. 1 is a perspective view of a conventional lifting type support stand.
Figure 2:
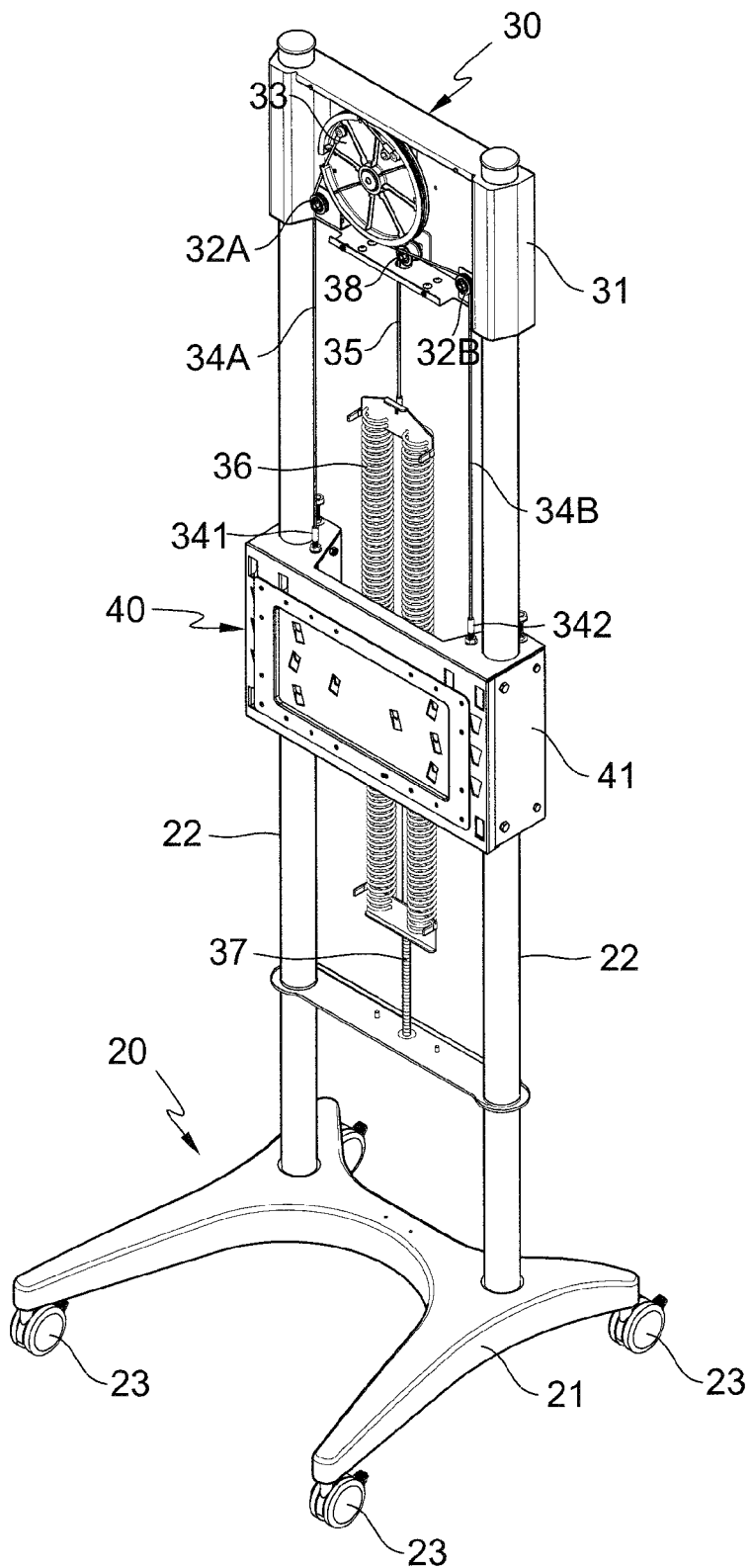
FIG. 2 is a perspective view of the present invention.

Referring to FIG. 2, a lifting type support stand of the embodiment includes a foot stand 20, drag mechanism 30 and hanging tool moving mechanism 40.

Referring to FIG. 2 additionally besides FIG. 2, the foot stand 20 includes a base 21, and two stand columns 22 configured on the base 21, where several casters 23 may configured on the bottom of the base 21.

Referring to FIGS. 2 to 5, the drag mechanism 30 is fixed on the two stand columns 22, including a fixation seat 31, where two idle wheels 32A, 32B are configured on the lower side of the fixation seat 31, and a sheave 33 is also coupled to the fixation seat 31. A first slot way 331 and second slot way 332 are formed on the periphery of the sheave 33, and a scroll 333 is configured on one side of the sheave 33, where a height of the scroll 333 is increased with the route thereof from outside to inside. Furthermore, the periphery of the scroll 333 is configured with a rope race 334, which forms a groove similar to a tapered spiral line with the scroll 333. Furthermore, a first rope 34A and second rope 34B and drag rope 35 are retained on the sheave 33, where the first rope 34A and second rope 34B are respectively configured along the first slot way 331 and second slot way 332 on the sheave 33. In addition, the first rope 34A and second rope 34B are respectively configured around the idle wheels 32A and 32B, allowing the first rope 34A and second rope 34B to be turned downward. Furthermore, another end of the first rope 34A, second rope 34B is then respectively coupled to the hanging tool moving mechanism 40. Furthermore, the drag rope 35 is configured around the rope race 334 of the scroll 333 on the rear side of the sheave 33, and another end of drag rope 35 is retained to an extension spring 36, another end of which is coupled to the foot stand 20.

Continued from the preceding paragraph, coupling elements 341 and 342 may respectively be configured on the ends of the first rope 34A and second rope 34B coupled to the hanging tool moving mechanism 40, allowing the first rope 34A and second rope 34B to be respectively coupled to the hanging tool moving mechanism 40 conveniently through the coupling elements 341 and 342.

Continued from the preceding paragraph, the extension spring 36 may be coupled to the food stand 20 through an adjusting bolt 37, thereby adjusting allowance of the extension spring 36.

Continued from the preceding paragraph, the extension spring 36 may also be a wire spring constituted by two springs of a different spring constant, thereby adjusting the load capacity of the extension spring 36.

Continued from the preceding paragraph, in a preferred embodiment, the fixation seat 31 is further configured with a guide idle wheel 38, which is adapted to guide the drag rope 35. Also, referring to FIG. 3, the hanging tool moving mechanism 40 includes a movable seat 41, and two through holes of the movable seat 41 (not shown in the figures) allows the two respective stand columns 22 of the foot stand 20 to be passed through thereby to position the movable seat 41 and move it vertically along the two stand columns 22. The first rope 34A and second rope 34B of the drag mechanism 30 are respectively coupled to the movable seat 41. Therefore, the first rope 34A and second rope 34B can further be driven to move to drive the sheave 33 to rotate through the vertically movable positioning of the movable seat 41 on the two stand columns 22. In addition, the front end of the movable seat 41 allows a display device 50 to be mounted thereon.

Figure 3:
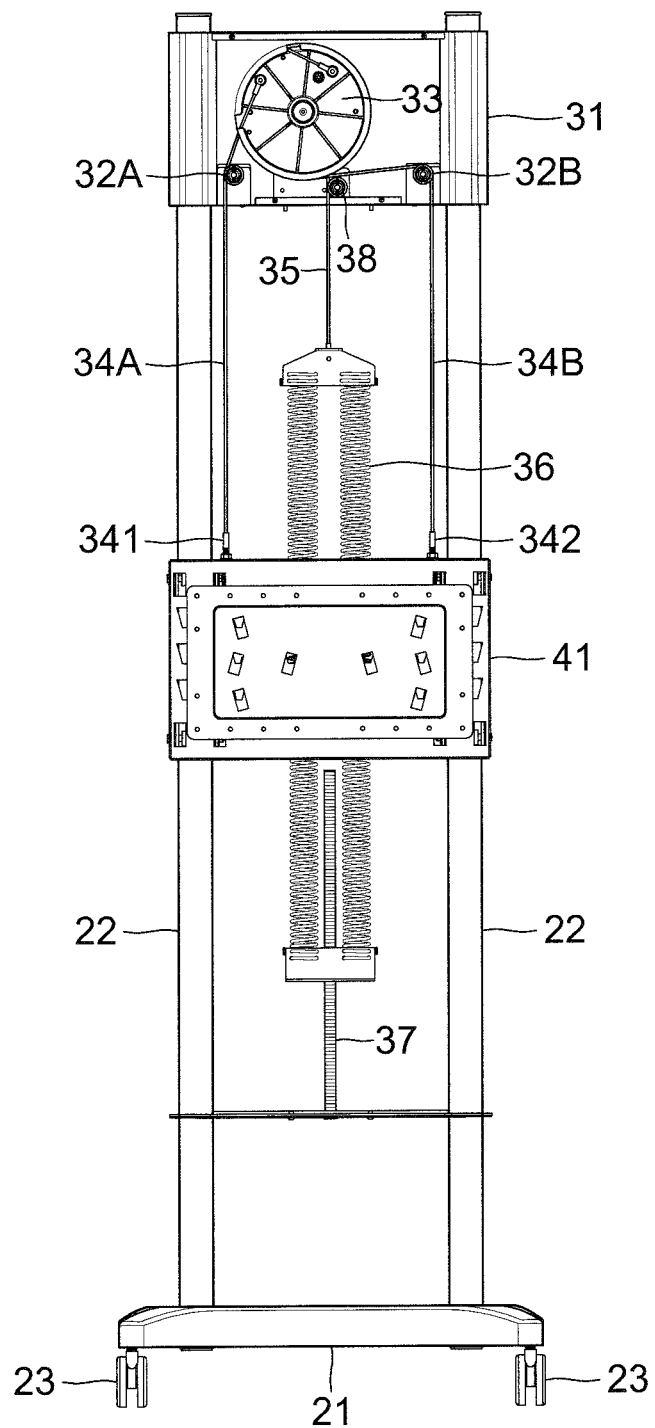
FIG. 3 is a front view of the present invention.
Figure 4:
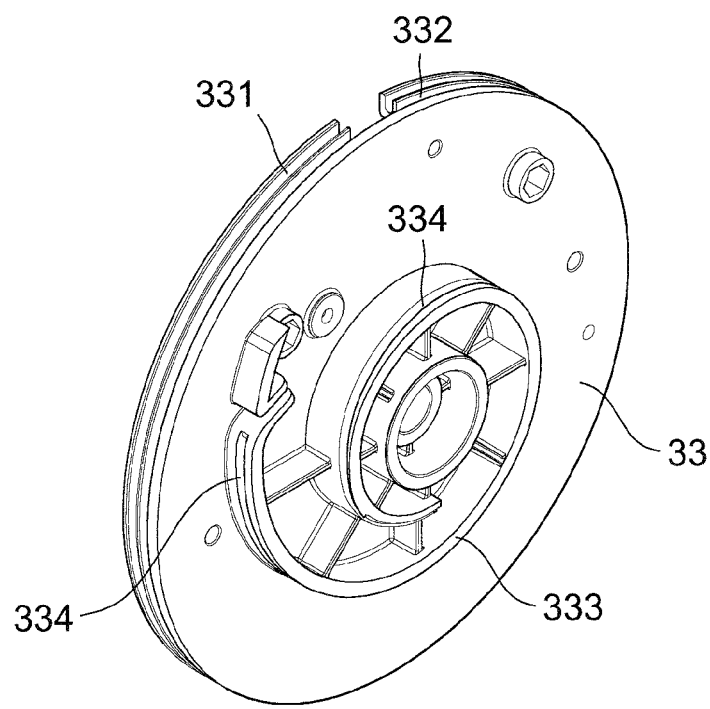
FIG. 4 is a perspective view of a sheave of the present invention.
Figure 5:
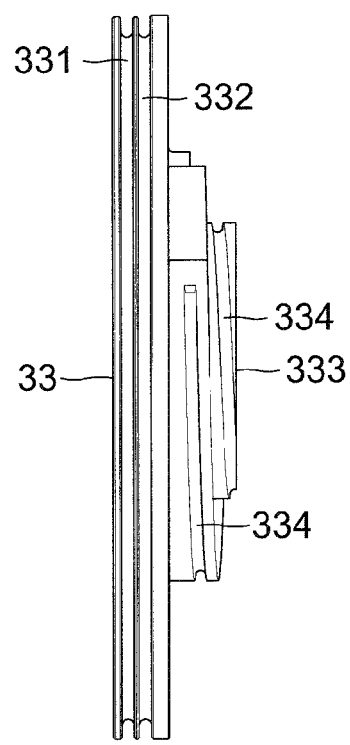
FIG. 5 is a lateral view of a sheave of the present invention.
Figure 6:
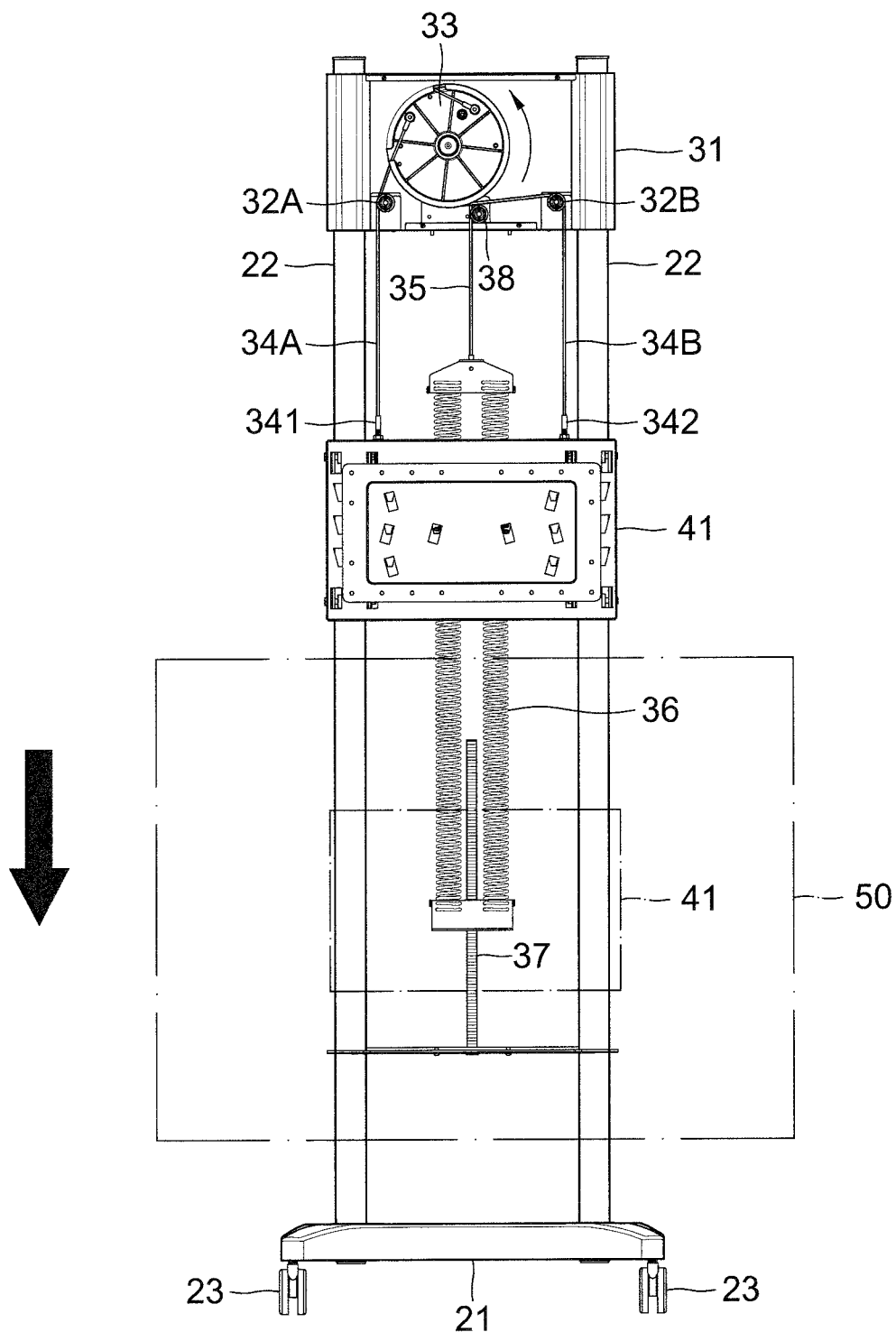
FIG. 6 is a front view of the present invention while a hanging tool moving mechanism and display device is moved downward.
Figure 7:
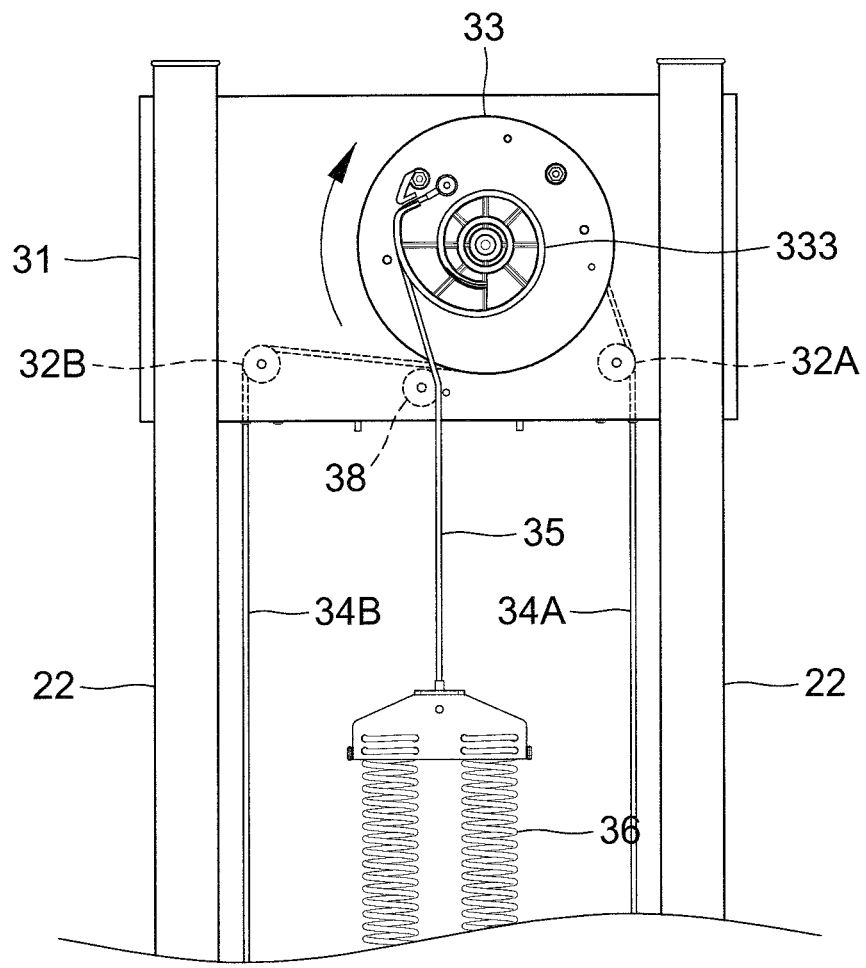
FIG. 7 is a rear view of the present invention while a drag rope is moved near to the axle center of a sheave with the rotation of the sheave.
Figure 8:
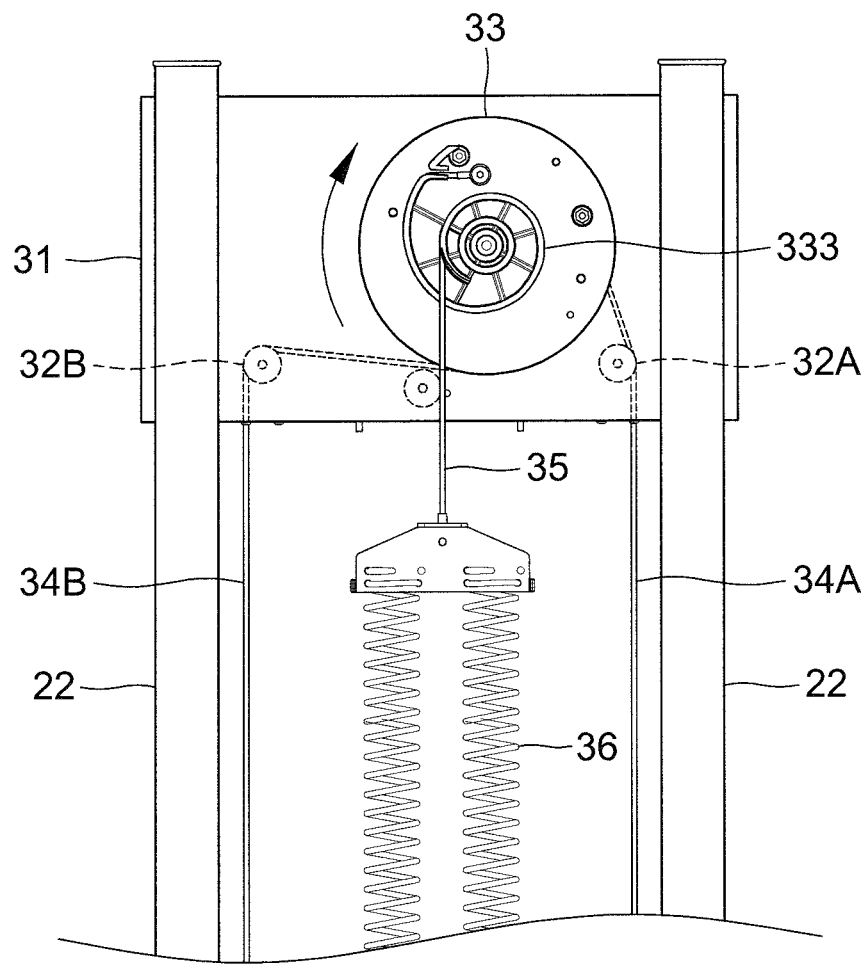
FIG. 8 is a rear view of the present invention while a drag rope is moved near to the axle center of a sheave with the rotation of the sheave.

With the above structure, as FIGS. 2 and 3 show, the sheave 33 is coupled to the hanging tool moving mechanism 40 through the first rope 34A and second rope 34B configured around the sheave 33, and the sheave 33 is coupled to the extension spring 36 through the drag rope 35 configured around the scroll 333 thereof. The hanging tool moving mechanism 40 and the display device 50 can be mounted through a reaction force of the extension spring 36, allowing a balance state to be formed among them. Furthermore, as FIG. 6 shows, the hanging tool moving mechanism 40 and display device 50 are moved downward to pull the first rope 34A and second rope 34B to move downward when the display device 50 is adjusted to move downward so that the first rope 34A and second rope 34B then drive the sheave 33 to rotate anticlockwise, and meanwhile, the scroll 333 of the sheave 33 then rolls up the drag rope 35 simultaneously and the extension spring 36 is then stretched by the drag rope 35 to extend. The hanging tool moving mechanism 40 and display device 50 are stopped moving downward after the display device 50 is moved downward to a preset height, causing the sheave 33 not to be pulled by the first rope 34A and second rope 34B to move to stop rotating. The hanging tool moving mechanism 40, display device 50 and extension spring 36 are allowed to be balanced to stop the hanging tool moving mechanism 40 and display device 50 from moving downward continuously through a reaction force of the extension spring 36 after the extension spring 36 is extended, and further to stay them at a preset height steplessly at will. In the meantime, the drag rope 35 surrounding the scroll 333 is allowed to be rolled up along the rope race 334 with the rotation of the sheave 33 and moved near to the axle center of the sheave 33, as FIGS. 7 and 8 show. Furthermore, because the curvature radius of the rope race 334 on the scroll 333 is smaller than the radius of first slot way 331 and second slot way 332 on the sheave 33, the length of the first rope 31A, second rope 30B released with the rotation of the sheave 33 is larger than the length of the drag rope 35 rolled up due to the rotation of the sheave 33, allowing the moving distance of the sheave 35 to be shorten, and reducing the extended length of the extension spring 36.

Figure 9:
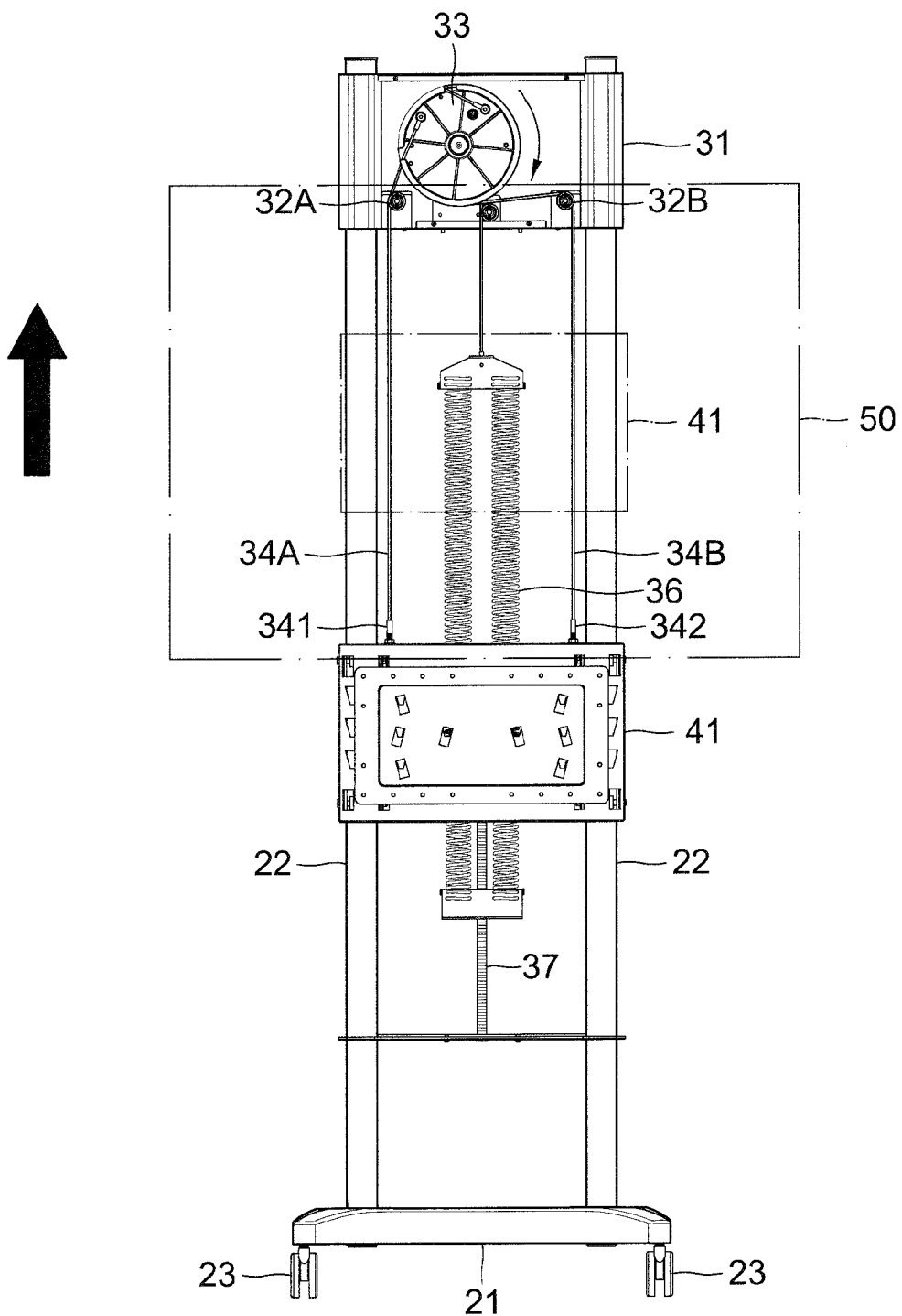
FIG. 9 is a front view of the present invention while a hanging tool moving mechanism and display device is moved upward.
Figure 10:
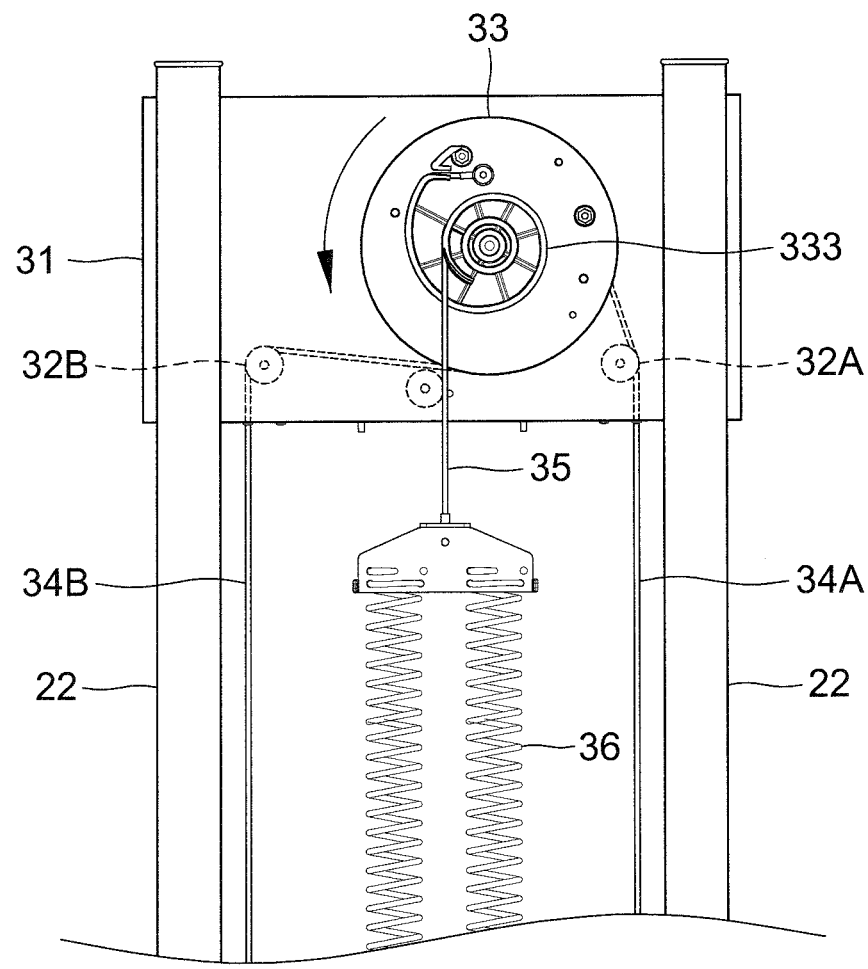
FIG. 10 is a rear view of the present invention while a drag rope is moved away from the axle center of a sheave with the rotation of the sheave.
Figure 11:
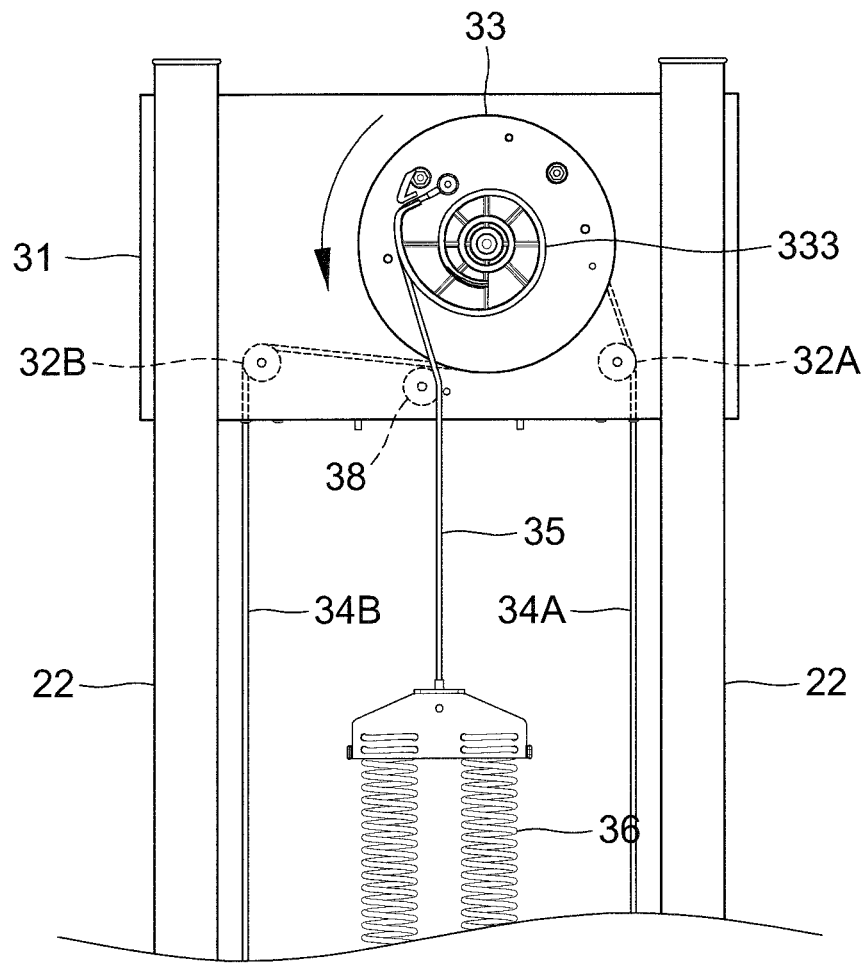
FIG. 11 is a rear view of the present invention while a drag rope is moved away from the axle center of a sheave with the rotation of the sheave.

Referring to FIG. 9, the hanging tool moving mechanism 40 and display device 50 are moved upward to drive the first rope 34A and second rope 34B to move upward and drive the sheave 33 to rotate clockwise, allowing the sheave 33 to roll up the first rope 34A and second rope 34B when the display device 50 is adjusted to move upward. The scroll 333 of the sheave 33 then releases the drag rope 35 simultaneously, and the extension spring 36 is no longer pulled by a force and restores. The hanging tool moving mechanism 40 and the display device 50 are stopped moving upward after the display device 50 is moved to a preset height, allowing the sheave 33 is not longer driven by the first rope 34A and second rope 34B. Thereafter, the hanging tool moving mechanism 40, display device 50 and extension spring 36 form a balance state through the reaction force of the extension spring 36, allowing the hanging tool moving mechanism 40 and display device 50 not to be moved downward continuously, and further allowing it to be stayed at the preset height steplessly at will. In the meantime, the drag rope 35 surrounding the scroll 333 is allowed to release along the rope race 334 with the rotation of the sheave 33 and moved away from the axle center of the sheave 33, as FIGS. 10 and 11 show. In this situation, the length of the first rope 31A, second rope 31B rolled up with the rotation of the sheave 33 is larger than the length of the drag rope 35 released due to the rotation of the sheave 33.

Figure 12:
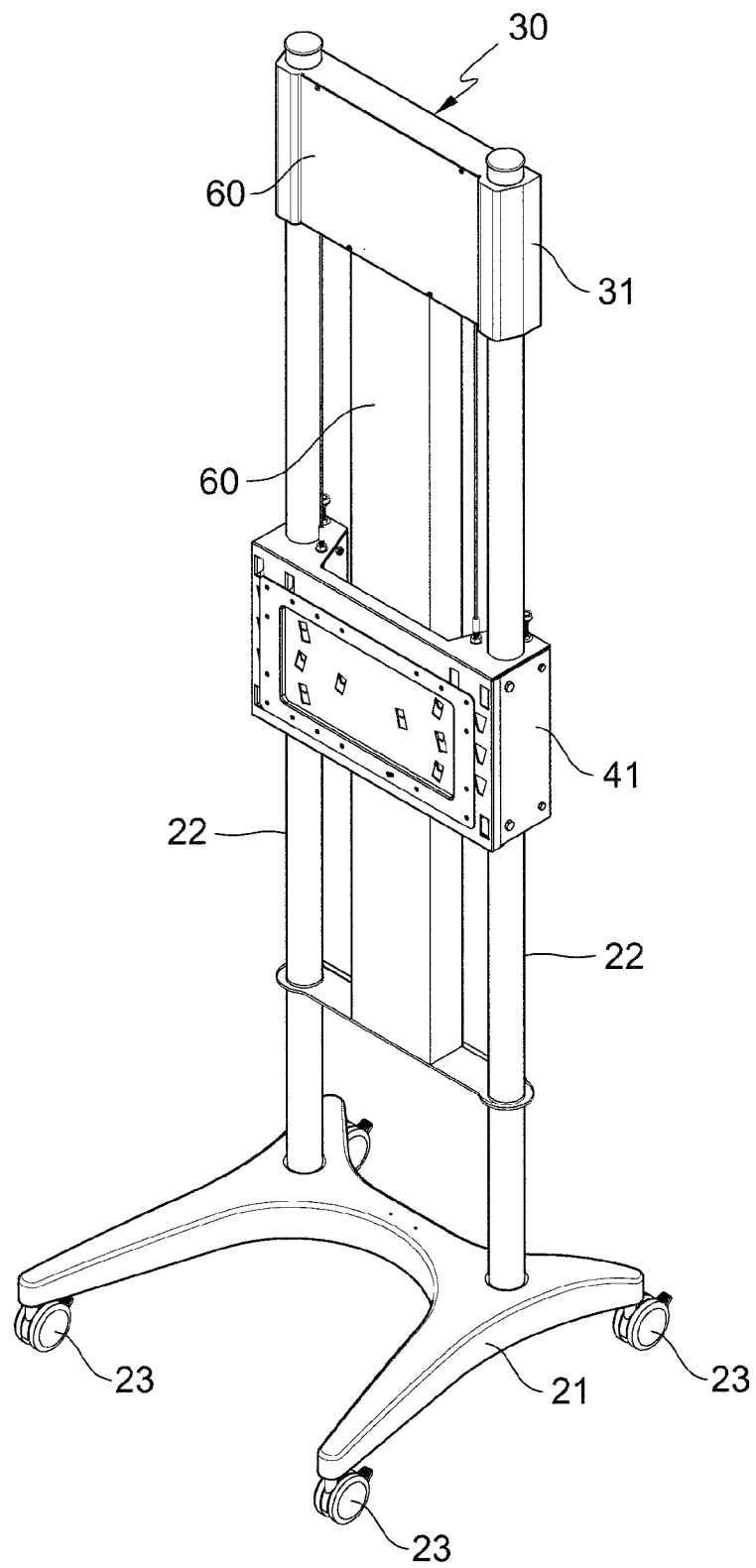
FIG. 12 is a perspective view of a sheave of the present invention covered with a shielding plate.

Continued from the preceding paragraph, in a preferred embodiment, the drag mechanism 30 is covered with a shielding plate 60 so as to cover up the idle wheels 32A and 32B, sheave 33, first rope 34A, second rope 34B, drag rope 35, extension spring 36, adjusting bolt 37 and guide idle wheel 38 in the drag mechanism 30, allowing them not to be exposed to the outside, as FIG. 12 shows.

Figure 13:
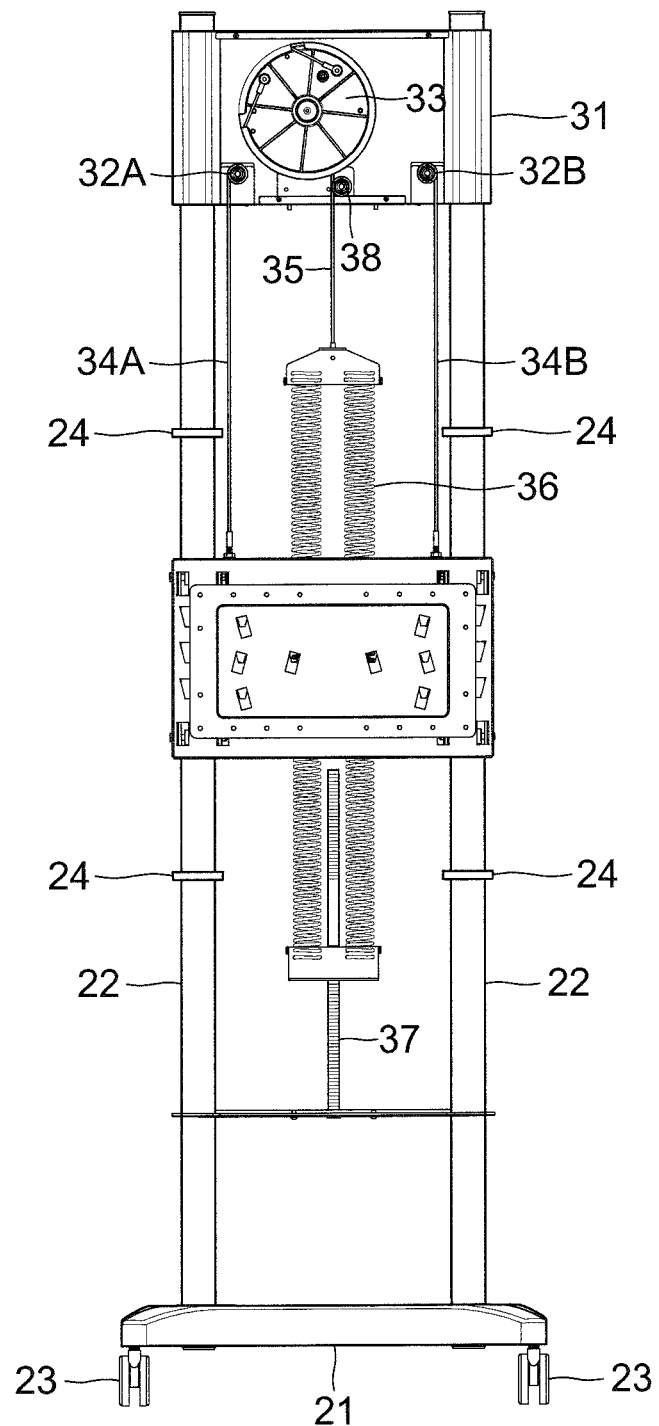
FIG. 13 is a front view of the present invention provided with stops configured on respective stand columns thereof.

Continued from the preceding paragraph, in a preferred embodiment, at least one stop 24 is configured on each stand column 22, used to stop the movable seat 41, thereby to limit a moving travel of the movable seat 41, as FIG. 13 shows.

Therefore, it can be known that the present invention has the following merits from the embodiments mentioned above and the figures:

1. a moving distance of the drag rope 35 is smaller than a moving distance of the first rope 34A, second rope 34B when the sheave 33 is rotated, leading to the decrease of an extension, use length of the extension spring 36, the reduction of a reaction force of the extension spring 36, and the prevention of the hanging tool moving mechanism 40 and display device 50 from sudden rise or drop while being moved vertically, because the drag rope 35 used to drag the extension spring 36 surrounding along the rope race 334 on the rear side of the sheave 33, which is disposed on the periphery of the scroll 333 to form an approximately tapered spiral line, and further because the curvature radius of the rope race 334 is smaller than the radius of the first slot way 331, second slot way 332, causing the perimeter of the rope race 334 is smaller than the perimeter of the first slot way 331, second slot way 332.

2. The distance between the drag rope 35 and the sheave is varied with the rolling-up or releasing of the sheave 35, capable of decreasing an extension length of the extension spring 36, reducing a reaction force to form a force balancing state when the extension spring 36 is exerted with a force to extend, and preventing sudden rise or sudden drop when the display device 50 is moved vertically by utilizing Pythagorean theorem, because the rope race 334 surrounded by the drag rope 35 of the present invention is an approximately tapered spiral line; the drag rope 35 is moved near to the axle center of the sheave 33 along the route of the spiral line with the rotation of the sheave 33 when the display device 50 is positioned at a lower point, as FIG. 8 shows, and the drag rope 35 is moved away from the axle center of the sheave 33 along the route of the spiral line with the rotation of the sheave 33 when the display device 50 is positioned at a higher point, as FIG. 8 shows.

3. The drag rope 35 is moved outward to the outside of the sheave 33 along the route of the rope race 334 when the sheave 33 is rotated, capable of preventing it from interfering with a coupling end of the sheave 33 to which the drag rope 35 is coupled when the drag rope 35 is rotated, increasing the circle number of the sheave 33, and further increasing the vertically moved distance of the hanging tool moving mechanism 40 and display device 50, because a height of the scroll 333 configured on the sheave 33 of the present invention increases from outside to inside with the routine thereof, allowing the rope race 334 configured on the periphery of the scroll 333 to form an approximately tapered spiral line.

4. The present invention can decrease the extension length of the extension spring pulled by the drag rope 35, reduce the shaking yielded after the extension spring 36 is extended, and increase the stability of the extension spring 36 and vertical motion of the hanging tool moving mechanism 40 and display device 50, because the use length of the extension spring 36 of the present invention is shorter, and the rope race 334 of an approximately tapered spiral line configured on the rear side of the sheave 33 is utilized.

5. The present invention has adjustment convenience for height, because a vertical position of the display device 50 can be adjusted quickly depending on user's requirements, the display device 50 can be moved upward after the use thereof is completed to prevent other persons' operation thereof, and the display device 50 can be prevented from dropping and the use safety is further increased by using the extension spring 36 to bear weight.

I claim:

1. A lifting type support stand, comprising:
a foot stand, comprising a base, and two stand columns being configured on said base;
a drag mechanism, retained to said two stand columns, and comprising a fixation seat, two idle wheels being configured on a lower side of said fixation seat, a sheave being configured on said fixation seat, a first slot way and second slot way being formed on a periphery of said sheave, a scroll being projected from another side of said sheave, a height of said scroll being increased from outside to inside gradually with a route thereof, a rope race being configured on a periphery of said scroll, said rope race being formed with said scroll into a groove of an approximately tapered spiral line, a first rope, a second rope and a drag rope being retained on said sheave, said first rope, said second rope being respectively configured along said first slot way and said second slot way of said sheave and surrounding said respective idle wheels, allowing said first rope and second rope to be turned downward, another end of said first rope, second rope being coupled to a hanging tool moving mechanism, said drag rope being configured along a rope race of said scroll configure on said sheave, another end of said drag rope being coupled to an extension spring, and another end of an extension rope being coupled to said foot stand; and
said hanging tool moving mechanism, comprising a movable seat, said movable seat being positioned on said two stand columns by passing said two stand columns of said foot stand through two through holes of said movable seat, thereby being moved along said stand columns, said movable seat being coupled to coupling elements of said first rope and second rope of said drag mechanism, and a display device being mounted on a front end of said moveable seat;
whereby, said lifting type support stand helpful to adjust a vertical position of said display device, and increase a moving distance thereof.

2. The support stand according to claim 1, wherein a plurality of casters are configured on a bottom of said base of said foot stand.

3. The support stand according to claim 1, wherein said extension spring is coupled to said foot stand through an adjustable bolt, thereby adjusting allowance of said extension spring.

4. The support stand according to claim 1, wherein said extension spring is a wire spring constituted by two springs of a different spring constant in series.

5. The support stand according to claim 1, wherein one of said coupling elements is respectively configured on ends of said first rope and second rope coupled to said hanging tool moving mechanism, allowing said first rope and said second rope to be coupled to said hanging tool moving mechanism conveniently.

6. The support stand according to claim 1, wherein one of said idle wheels is configured on said fixation seat, said guide idle wheel is configured below said sheave relatively, thereby guiding said drag rope.

7. The support stand according to claim 1, wherein a shielding plate is covered on said drag mechanism.

8. The support stand according to claim 1, wherein at least one stop is configured on said two respective stand columns.

* * * * *